(12) United States Patent
Bhatnagar et al.

(10) Patent No.: US 7,288,493 B2
(45) Date of Patent: Oct. 30, 2007

(54) BODY ARMOR WITH IMPROVED KNIFE-STAB RESISTANCE FORMED FROM FLEXIBLE COMPOSITES

(75) Inventors: Ashok Bhatnagar, Richmond, VA (US); Huy X. Nguyen, Midlothian, VA (US); John E. Holland, Bailey, NC (US)

(73) Assignees: Honeywell International Inc., Morristown, NJ (US); JHRG LLC, Spring Hope, NC (US)

(*) Notice: Subject to any disclaimer, the term of this patent is extended or adjusted under 35 U.S.C. 154(b) by 111 days.

(21) Appl. No.: 11/037,680

(22) Filed: Jan. 18, 2005

(65) Prior Publication Data

US 2007/0173150 A1 Jul. 26, 2007

(51) Int. Cl.
*B32B 27/04* (2006.01)
*B32B 27/12* (2006.01)

(52) U.S. Cl. ............... 442/134; 442/135; 2/2.5; 89/36.01; 89/36.02; 89/36.05; 428/911

(58) Field of Classification Search ........ 442/134, 442/135; 428/911; 2/2.5; 89/36.01, 36.02, 89/36.05
See application file for complete search history.

(56) References Cited

U.S. PATENT DOCUMENTS

| | | | |
|---|---|---|---|
| 3,671,542 A | 6/1972 | Kwolek et al. ............ 524/157 |
| 3,975,487 A | 8/1976 | Cottis et al. ............ 264/210.6 |
| 4,118,372 A | 10/1978 | Schaefgen ............ 528/190 |
| 4,137,394 A | 1/1979 | Meihuizen et al. ........ 528/100 |
| 4,161,470 A | 7/1979 | Calundann ............ 524/599 |
| 4,356,138 A | 10/1982 | Kavesh et al. ............ 264/164 |
| 4,403,012 A | 9/1983 | Harpell et al. ............ 428/290 |
| 4,413,110 A | 11/1983 | Kavesh et al. ........... 526/348.1 |
| 4,440,711 A | 4/1984 | Kwon et al. ............ 264/185 |
| 4,457,985 A | 7/1984 | Harpell et al. ............ 428/224 |
| 4,501,856 A | 2/1985 | Harpell et al. ............ 525/423 |
| 4,535,027 A | 8/1985 | Kobashi et al. ............ 428/364 |
| 4,543,286 A | 9/1985 | Harpell et al. ............ 428/288 |
| 4,563,392 A | 1/1986 | Harpell et al. ............ 428/394 |
| 4,584,347 A | 4/1986 | Harpell et al. ............ 525/119 |
| 4,599,267 A | 7/1986 | Kwon et al. ............ 428/364 |
| 4,613,535 A | 9/1986 | Harpell et al. ............ 428/113 |
| 4,623,574 A | 11/1986 | Harpell et al. ............ 428/113 |
| 4,650,710 A | 3/1987 | Harpell et al. ............ 428/263 |
| 4,681,792 A | 7/1987 | Harpell et al. ............ 428/102 |
| 4,737,401 A | 4/1988 | Harpell et al. ............ 428/252 |
| 4,820,568 A | 4/1989 | Harpell et al. ............ 428/113 |
| 4,883,700 A | 11/1989 | Harpell et al. ............ 428/113 |
| 4,916,000 A | 4/1990 | Li et al. ............ 428/105 |
| 4,953,234 A | 9/1990 | Li et al. ............ 2/412 |
| 5,006,390 A | 4/1991 | Kavesh et al. ............ 428/105 |
| 5,061,545 A | 10/1991 | Li et al. ............ 428/195 |
| 5,082,721 A * | 1/1992 | Smith et al. ............ 442/289 |
| 5,112,667 A | 5/1992 | Li et al. ............ 428/113 |
| 5,124,195 A | 6/1992 | Harpell et al. ............ 428/152 |
| 5,165,989 A | 11/1992 | Bhatnagar et al. ......... 428/245 |
| 5,167,876 A | 12/1992 | Lem et al. ............ 252/602 |
| 5,175,040 A | 12/1992 | Harpell et al. ............ 428/113 |
| 5,185,195 A | 2/1993 | Harpell et al. ............ 428/102 |
| 5,187,023 A | 2/1993 | Prevorsek et al. ......... 442/228 |
| 5,190,802 A | 3/1993 | Pilato ............ 428/111 |
| 5,196,252 A | 3/1993 | Harpell et al. ............ 428/102 |
| 5,286,833 A | 2/1994 | Bubeck et al. ............ 528/183 |
| 5,296,185 A | 3/1994 | Chau et al. ............ 264/205 |
| 5,330,820 A | 7/1994 | Li et al. ............ 428/105 |
| 5,343,796 A * | 9/1994 | Cordova et al. .......... 89/36.02 |
| 5,356,584 A | 10/1994 | Bubeck et al. ............ 264/205 |
| 5,471,906 A | 12/1995 | Bachner, Jr. et al. ...... 89/36.05 |
| 5,534,205 A | 7/1996 | Faley et al. ............ 264/103 |
| 5,552,208 A | 9/1996 | Lin et al. ............ 428/113 |
| 5,587,230 A | 12/1996 | Lin et al. ............ 428/245 |
| 5,674,969 A | 10/1997 | Sikkema et al. ............ 528/183 |
| 5,677,029 A | 10/1997 | Prevorsek et al. ......... 428/113 |
| 5,702,657 A | 12/1997 | Yoshida et al. ............ 264/112 |
| 5,939,553 A | 8/1999 | Reichwein et al. ........ 546/250 |
| 5,945,537 A | 8/1999 | Sikkema ............ 546/307 |
| 6,040,050 A | 3/2000 | Kitagawa et al. .......... 428/364 |
| 6,040,478 A | 3/2000 | Sikkema et al. ............ 562/424 |
| 6,127,291 A * | 10/2000 | Coppage et al. ............ 442/135 |
| 6,219,842 B1 | 4/2001 | Bachner, Jr. ............ 2/2.5 |
| 6,248,676 B1 | 6/2001 | Dischler ............ 442/217 |
| 6,268,301 B1 | 7/2001 | Dalman et al. ............ 442/101 |
| 6,280,546 B1 | 8/2001 | Holland et al. ............ 156/85 |
| 2001/0053645 A1* | 12/2001 | Henderson ............ 442/135 |
| 2003/0199215 A1* | 10/2003 | Bhatnagar et al. ......... 442/135 |
| 2004/0154847 A1 | 8/2004 | Holland et al. ............ 180/127 |

FOREIGN PATENT DOCUMENTS

WO WO2005/007478 1/2005

OTHER PUBLICATIONS

Grant & Hackh's Chemical Dictionary, 4th ed., 1969, pp. 1, 3.
Lightweight Ballistic Composites—Military and Law-enforcement Applications, edited by A. Bhatnagar, CRC Press, 2006, pp. 8-10.

* cited by examiner

*Primary Examiner*—Ula C. Ruddock
(74) *Attorney, Agent, or Firm*—Bruce O. Bradford

(57) ABSTRACT

Flexible body armor formed from flexible composites which have improved knife-stab resistance. The body armor is formed from composites which include layers of a fabric base, formed from high tenacity fibers, and a rubber layer bonded to the fabric base. A thermoplastic bonding layer may be used to bond the fabric and rubber layers together. To provide ballistic resistance, the body armor may also include a ballistic resistant composite of a network of high tenacity fibers.

48 Claims, No Drawings

BODY ARMOR WITH IMPROVED KNIFE-STAB RESISTANCE FORMED FROM FLEXIBLE COMPOSITES

BACKGROUND OF THE INVENTION

1. Field of the Invention

This invention relates to body armor which incorporates flexible fiber composites and has improved knife-stab resistance.

2. Description of the Related Art

Body armor, such as bullet-resistant vests, are known in the art. Such armor may be made from various constructions in which high strength fibers are incorporated into various composites. Body armor may be in the form of rigid composites and flexible composites.

Rigid body armor provides good resistance to puncture by sharp objects, such as knife blades, but they are also very stiff and relatively bulky. As a result, rigid body armor garments (e.g., vests) are less comfortable to wear than flexible body armor garments. However, the latter may not provide adequate resistance to knife blades and the like.

It would be desirable to provide a body armor which was both flexible and resistant to puncture by sharp objects, such as sharp knives. Such armor desirably would be comfortable to wear and not costly to manufacture. In addition, it would be desirable to provide a flexible knife-stab resistant composite material which can also be used with ballistic resistant materials to provide additional protection to the wearer.

SUMMARY OF THE INVENTION

In accordance with this invention, there is provided flexible body armor which is knife-stab resistant, the body armor comprising at least one layer of a flexible composite, the flexible composite comprising a fabric base formed from a network of high tenacity fibers, and a rubber layer bonded to the fabric base.

The flexible composite may also comprise a bonding layer comprising a thermoplastic material bonded to the fabric base and to the rubber layer.

Further in accordance with this invention, there is provided flexible body armor which is knife-stab resistant and is also ballistic resistant, the body armor comprising at least one knife-stab resistant layer of a flexible composite, the flexible composite comprising a fabric base formed from a network of high tenacity fibers, and a rubber layer bonded to the fabric base, and at least one layer of a ballistic resistant composite comprising a network of high tenacity fibers. The network of high tenacity fibers in the ballistic resistant composite may be in a matrix of an elastomeric material.

Also in accordance with this invention, there is provided flexible body armor which is knife-stab resistant and is also ballistic resistant, the body armor comprising a plurality of knife-stab resistant layers of a flexible composite, the flexible composite comprising a fabric base formed from a network of high tenacity fibers, at least 50 percent by weight of the fibers in the fabric comprising high molecular weight polyethylene fibers, a bonding layer comprising a thermoplastic material bonded to the fabric base, and a rubber layer bonded to the bonding layer; and a plurality of flexible ballistic-resistant composite layers, the flexible ballistic-resistant composite layers comprising a network of high tenacity fibers comprising at least 50 percent by weight of fibers selected from the group consisting of high molecular weight polyethylene, aramid, and blends thereof.

The present invention provides a flexible body armor which is knife-stab resistant. This body armor is comfortable to wear and is cost effective to manufacture. The flexible body armor can be used in combination with a ballistic-resistant composite material to provide enhanced knife-stab resistance and ballistic resistance.

DETAILED DESCRIPTION OF THE INVENTION

The present invention comprises flexible body armor that is resistant to puncture by knives and is formed from high tenacity fibers. For the purposes of the present invention, a fiber is an elongate body the length dimension of which is much greater that the transverse dimensions of width and thickness. Accordingly, the term fiber includes filament, ribbon, strip, and the like having regular or irregular cross-section. A yarn is a continuous strand comprised of many fibers or filaments.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

The network of fibers used in the knife-stab resistant composite of the present invention may be in the form of woven, knitted or non-woven fabrics formed from high tenacity fibers. Preferably, at least 50% by weight of the fibers in the fabric are high tenacity fibers, and more preferably at least about 75% by weight of the fibers in the fabric are high tenacity fibers.

The yarns and fabrics of the invention may be comprised of one or more different high strength fibers. The yarns may be in essentially parallel alignment, or the yarns may be twisted, over-wrapped or entangled. The fabrics of the invention may be woven with yarns having different fibers in the warp and weft directions, or in other directions.

High strength fibers useful in the yarns and fabrics of the invention include highly oriented high molecular weight polyolefin fibers, particularly high modulus polyethylene fibers, aramid fibers, polybenzazole fibers such as polybenzoxazole (PBO) and polybenzothiazole (PBT), polyvinyl alcohol fibers, polyacrylonitrile fibers, liquid crystal copolyester fibers, glass fibers, carbon fibers or basalt or other mineral fibers, as well as rigid rod polymer fibers, and mixtures and blends thereof. Preferred high strength fibers useful in this invention include polyolefin fibers, aramid fibers and polybenzazole fibers, and mixtures and blends thereof. Most preferred are high molecular weight polyethylene fibers.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. Nos. 4,137,394 and 4,356,138), or a filament spun from a solution to form a gel structure (see U.S. Pat. No.

4,41.3,110, German Off. No. 3,004,699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers (also referred to as extended chain polyethylene fibers) are preferred and are sold under the trademark SPECTRA® by Honeywell International Inc. of Morristown, N.J.

Depending upon the formation technique, the draw ratio and temperatures, and other conditions, a variety of properties can be imparted to these fibers. The tenacity of the fibers are at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least about 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

In the case of aramid fibers, suitable fibers formed from aromatic polyamides are described in U.S. Pat. No. 3,671,542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 20 g/d, a modulus of at least about 900 g/d and an energy-to-break of at least about 30 J/g. For example, poly(p-phenylene terephthalamide) filaments which have moderately high moduli and tenacity values are particularly useful in forming ballistic resistant composites. Examples are Kevlar® 29 which has 500 g/d and 22 g/d and Kevlar® 49 which has 1000 g/d and 22 g/d as values of initial tensile modulus and tenacity, respectively. Also useful in the practice of this invention are poly(m-phenylene isophthalamide) fibers produced commercially by du Pont under the trade name Nomex®.

High molecular weight polyvinyl alcohol (PV-OH) fibers having high tensile modulus are described in U.S. Pat. No. 4,440,711 to Kwon et al., which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/d, a tenacity preferably at least about 10 g/d, more preferably at least about 14 g/d and most preferably at least about 17 g/d, and an energy to break of at least about 8 J/g. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of preferably at least about 10 g/d and an energy to break of at least about 8 J/g. PAN fiber having a molecular weight of at least about 400,000. a tenacity of at least about 15 to 20 g/d and an energy to break of at least about 8 J/g is most useful; and such fibers are disclosed, for example, in U.S. Pat. No. 4,535,027.

Suitable liquid crystal copolyester fibers for the practice of this invention are disclosed, for example, in U.S. Pat. Nos. 3,975,487; 4,118,372 and 4,161,470.

Suitable polybenzazole fibers for the practice of this invention are disclosed, for example, in U.S. Pat. Nos. 5,286,833, 5,296,185, 5,356,584, 5,534,205 and 6,040,050. Preferably, the polybenzazole fibers are Zylon® brand fibers from Toyobo Co.

Rigid rod fibers are disclosed, for example, in U.S. Pat. Nos. 5,674,969, 5,939,553, 5,945,537 and 6,040,478. Such fibers are available under the designation M5® fibers from Magellan Systems International.

As mentioned above, the high strength fibers may be in the form of a woven, knitted or non-woven fabric. One preferred material is a woven fabric formed from SPECTRA® polyethylene fibers. In one embodiment, the fabric preferably has between about 15 and about 45 ends per inch (about 5.9 to about 17.7 ends per cm) in both the warp and fill directions, and more preferably between about 17 and about 33 ends per inch (about 6.7 to about 13 ends per cm).

The yarns are preferably each between about 650 and about 1200 denier. The result is a woven fabric weighing preferably between about 2 and about 15 ounces per square yard (about 67.8 to about 508.6 g/m$^2$), and more preferably between about 5 and about 11 ounces per square yard (about 169.5 to about 373.0 g/m$^2$). The following table provides fabric constructions that are suitable for use in the present invention. As those skilled in the art will appreciate, the fabric constructions described here are exemplary only and not intended to limit the invention thereto. Each of these uncoated fabrics is available from Hexcel of Anderson, S.C., and is made from SPECTRA® fiber:

| Style | Weave | Weight (Oz/Yd$^2$) | Thickness (Inches) | Counts (Ends/Inch) | Yarn Denier (Warp/Fill) |
|---|---|---|---|---|---|
| 902 | Plain | 5.5 | 0.018 | 17 × 17 | 1200/1200 |
| 904 | Plain | 6.3 | 0.017 | 35 × 35 | 650/650 |
| 952 | Plain | 6.0 | 0.017 | 34 × 34 | 650/650 |

As shown in the table, a plain weave fabric having 17 ends per inch of 1200 denier SPECTRA® 900 fiber in both the warp and fill directions weighs only about 5.5 ounces per square yard (about 186.5 g/m$^2$), but has a breaking strength of greater than 800 pounds force per inch (1401 N/cm) in both directions. Other weaves than a plain weave may be employed, such as a basket weave. The preferred fabric is a style 902 fabric.

The high strength fabric may be in the form of a non-woven fabric, such as plies of unidirectionally oriented fibers, or fibers which are felted in a random orientation, which are embedded in a suitable resin matrix, as is known in the art. Fabrics formed from unidirectionally oriented fibers typically have one layer of fibers which extend in one direction and a second layer of fibers which extend in a direction 90° from the first fibers. Where the individual plies are unidirectionally oriented fibers, the successive plies are preferably rotated relative to one another, for example at angles of 0°/90° or 0°/45°/90°/45°/0° or at other angles.

The resin matrix for the unidirectionally oriented fiber plies may be formed from a wide variety of elastomeric materials having appropriately low modulus. Preferably, the elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa).

The elastomeric material preferably forms about 1 to about 98 percent by weight, more preferably from about 10 to about 95 percent by weight, of the non-woven fabric of the knife-stab resistant laminate.

A wide variety of elastomeric materials may be utilized as the resin matrix. For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, and copolymers of ethylene.

Preferred for polyethylene fabrics are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type R-(BA)$_x$(x=3-150); wherein A is a block from a polyvinyl aromatic monomer and B is a block from a conjugated diene elastomer.

The elastomeric material may be compounded with fillers such as carbon black, silica, etc and may be extended with oils and vulcanized by sulfur, peroxide, metal oxide or radiation cure systems using methods well known to rubber technologists. Blends of different elastomeric materials may be used together or one or more elastomers may be blended with one or more thermoplastics.

Preferred bonding materials for the bonding layer are films of olefin polymers or copolymers having a melting point or melting point range less than about 140° C., particularly ethylene polymers and copolymers (e.g., ethylene/propylene copolymers). Melting point is determined, for example, by differential scanning calorimetry (DSC) at a heating rate of 10° C. per minute. The most preferred bonding materials are low density polyethylene (LDPE), ethylene vinyl acetate (EVA) and LDPE/EVA copolymers. The bonding layer can be applied in any suitable form, although a film is particularly preferred. The film can be used to coat and bond to the high performance fabric base described hereinabove, while creating the intermediate bonding layer. EVA bonds particularly well to fabric woven from yarns containing high-strength, ultra-high molecular weight polyethylene fibers. The EVA layer acts as a highly satisfactory intermediate bonding layer that has a bonding affinity for both the inner fabric base layer and the outer layer of a rubber compound. While a thickness of up to about 40 mils (about 1 mm) is possible, it has been found that a thermoplastic film laminate of between about 4 and about 15 mils (about 0.1 to about 0.38 mm) thickness on each side of the fabric provides the most suitable flexible sheet construction. In particular, it has been found that a film thickness on each side of between about 4 mils (0.1 mm) and about 10 mils (0.25 mm) is most desirable when the EVA is used as an intermediate bonding layer. Polyethylene and ethylene vinyl acetate films each weigh about one ounce per mil of thickness per square yard. Thus, a 4 mil laminate on both sides of the fabric sheet adds only about 8 ounces (4 ounces on each side) to the total weight per square yard (about 271 g/m$^2$).

The rubber compound which is attached to the high tenacity fabric preferably comprises natural rubber and styrene butadiene. In addition, a rubber compound further including natural rubber, styrene butadiene, and polybutadiene, or natural rubber and polybutadiene is also suitable for forming the rubber layer. The following table summarizes some of the exemplary compounds useful in the constructions of this invention. Each of these formulations is available from Specialty Tires of America of Indiana, Pa.

| Formulation | Natural Rubber | Styrene Butadiene | Polybutadiene |
|---|---|---|---|
| 2148 | 80% | 20% | 0% |
| 2160 | 66% | 14% | 20% |

-continued

| Formulation | Natural Rubber | Styrene Butadiene | Polybutadiene |
|---|---|---|---|
| 2141 | 75% | 0% | 25% |
| 2170 | 25% | 35% | 40% |

These rubber compound formulations are obtained as uncured (B-Stage) raw compounds. Once cured, the resulting rubber is relatively hard but is still substantially thin and flexible. The rubber sheet is preferably between about 5 and about 50 mils (about 0. 3 to about 1.27 mm) thick, more preferably between about 15 and about 40 mils (about 0.38 to 1 mm) thick, and most preferably about 30 mils (0.76 mm) thick. A release paper may be used to maintain the consistent application (thickness) of the uncured rubber sheet to the coated high strength fabric.

The knife-stab resistant layers may be formed in any suitable manner. For example, the thermoplastic film if employed may first be attached to the fabric in accordance with the teachings of U.S. Pat. No. 6,280,546. The final sheet-forming process may be conducted using a three-step process. The first step includes the tacking of the EVA-coated fabric to a raw rubber compound sheet, with the coated fabric and the rubber sheet being supplied from rolls on a continuous basis. A calendar roll may be used to press the two sheets together to form a lightly covered sheet. As those skilled in the art will appreciate, the process is easily modified where the rubber sheet is desired on both sides of the sheet material.

A suitable machine for tacking the rubber compound sheet to the coated fabric is the Van Vlandrin Silk Calender with a husk soft roll and a steel center roll. Unlike some calendering processes, there is little or no heat applied during the tacking step, to avoid premature curing of the rubber sheet. Once the coated fabric is initially adhered to the rubber sheet, it can be separated therefrom easily until heated and cured. Because the rubber sheet is uncured, i.e., "tacky", the underlying coated fabric inner layer is important in providing support and underlying structure for the uncured rubber sheet.

After the coated fabric and rubber sheet have been tacked together, the combination may be wound into a bundle around a core with an appropriate release paper between the windings, and secured with a heat resistant tape. The release paper may be positioned so as to be directly adjacent the paper core during windup. There is no requirement, however, that the coated fabric and rubber sheet be wound into a roll. Alternatively, the coated fabric and rubber sheet could be collected and moved along an elongate collection device such as a continuously moving conveyor-type belt. It is important, however, that the roll, or other collection device, be continuously rotated/rolled during the curing/baking process. This is important since the initially uncured rubber sheet will tend to slough or sag under its own weight during the initial hours of the curing process. By continuously rotating the roll, the uniformity of cure and the thickness of the final outer protective layer are assured.

Next, the bundle may be baked in an oven for between about 4 hours and about 24 hours at a temperature between about 230 to about 280° F. (about 110 to about 138° C.). As will be appreciated by those skilled in the material arts, lower curing temperatures require a longer duration to sufficiently complete the curing of the rubber sheet.

One or more knife-stab resistant layers may be employed in the body armor of this invention. The multiple layer structure may be made of the same or different individual composite layers.

In a preferred embodiment of this invention, the body armor is also resistant to ballistic projectiles. In this embodiment, a ballistically resistant composite comprising a network of high tenacity fibers is present. These fibers may be in a matrix of a low modulus material. In general, those fibers which are discussed above with respect to the knife-stab resistant layer are suitable for use in the ballistic-resistant layer. Preferably at least 50 percent by weight of the fibers in the ballistically resistant composite comprise the high tenacity fibers, and more preferably at least 75 percent by weight of the fibers in such composite comprise the high tenacity fibers. It should be noted that the same or different high tenacity fibers may be used in the knife-stab resistant layer and the ballistic-resistant layer.

Various constructions are known for fiber-reinforced composites used in impact and ballistic resistant articles such as helmets, panels, and vests. These composites display Wearying degrees of resistance to penetration by high speed impact from projectiles such as bullets, shrapnel and fragments, and the like. For example, U.S. Pat. Nos. 6,268,301 B1 6,248,676 B1, 6,219,842 B1; 5,677,029, 5,587,230; 5,552,208; 5,471,906; 5,330,820; 5,196,252; 5,190,802; 5,187,023; 5,185,195; 5,175,040; 5,167,876; 5,165,989; 5,124,195; 5,112,667; 5,061,545; 5,006,390; 4,953,234; 4,916,000; 4,883,700; 4,820,568; 4,748,064; 4,737,402; 4,737,401; 4,681,792; 4,650,710; 4,623,574; 4,613,535; 4,584,347; 4,563,392; 4,543,286; 4,501,856; 4,457,985; and 4,403,012; PCT Publication No. WO 91/12136; and a 1984 publication of E.I. DuPont De Nemours International S.A. entitled "Lightweight Composite Hard Armor Non Apparel Systems with T-963 3300 dtex DuPont Kevlar 29 Fibre", all describe ballistic resistant composites which include high strength fibers made from materials such as high molecular weight polyethylene, aramids and polybenzazoles. Such composites are said to be either flexible or rigid depending on the nature of their construction and the materials employed.

Ballistically resistant composites are typically formed from woven or knitted fabrics or sheets of fibers which are plied together. The fibers in a sheet may be unidirectionally oriented, with two layers of such unidirectionally oriented fibers cross-plied in a 0°/90° arrangement or felted in random orientation. Where the individual plies are unidirectionally oriented fibers, the successive plies are preferably rotated relative to one another, for example at angles of 0°/90° or 0°/45°/90°/45°/0° or at other angles. The individual plies of woven fabrics or fibers are either uncoated or embedded in a polymeric matrix material which fills the void spaces between the fibers. If no matrix is present, the fabric or fiber sheet is inherently flexible, and if a matrix is used it is preferably a flexible one. Preferably, the ballistic resistant layers of this invention are fabrics formed from polyethylene or aramid fibers. As is known in the art, typically several layers of the ballistic-resistant composite are employed in the body armor to provide the requisite ballistic resistance, and the individual layers may be formed from different fibers or be in a different configuration than an adjacent layer.

The fabric portion of the ballistically-resistant layers may be a woven fabric that may be of any weave pattern, including plain weave, twill, satin, three dimensional woven fabrics, and any of their several variations. Plain weave fabrics are preferred and more preferred are plain weave fabrics having an equal warp and weft count.

It will be understood to those skilled in the art that it is not presently possible to specify a priori the best weave count for any particular combination of material, fiber denier and yarn denier. On the one hand, tighter weaves having the highest possible coverage make it more difficult for the projectile to find holes and to push yarns and fibers aside. On the other hand, high frequency of yarn cross-overs restricts propagation of the ballistic event through the fabric and lessens the volume of fibers able to absorb energy from the projectile. The skilled artisan will readily find the best yarn count for each fiber material, yarn denier and filament denier by experimentation.

For 1200 denier polyethylene yarns such as SPECTRA® 900 yarns produced by Honeywell International Inc., plain weave fabrics with about 15×15 ends/inch (about 5.9 ends/cm) to about 45×45 ends/inch (17.7 ends/cm) are preferred. More preferred are plain weave fabrics having from about 17×17 ends/inch (6.7 ends/cm) to about 23×23 ends/inch (9.0 ends/cm). For 650 denier SPECTRA® 900 polyethylene yarns, plain weave fabrics having from about 20×20 ends/inch (7.9 ends/cm) to about 40×40 ends/inch (16 ends/cm) are preferred. For 215 denier SPECTRA® 1000 polyethylene yarns, plain weave fabrics having from about 40×40 ends/inch (16 ends/cm) to about 60×60 ends/inch (24 ends/cm) are preferred.

The yarns of the laminates useful in the ballistic resistant layers may be from about 50 denier to about 3000 denier. The selection is governed by considerations of ballistic effectiveness and cost. Finer yarns are more costly to manufacture and to weave, but can produce greater ballistic effectiveness per unit weight. The yarns are preferably from about 200 denier to about 3000 denier. More preferably, the yarns are from about 650 denier to about 1500 denier. Most preferably, the yarns are from about 800 denier to about 1300 denier.

The cross-sections of fibers useful herein may vary widely. They may be circular, flat or oblong in cross-section. They may also be of irregular or regular multi-lobal cross-section having one or more regular or irregular lobes projecting from the linear or longitudinal axis of the fibers. It is preferred that the fibers be of substantially circular, flat or oblong cross-section, most preferably the former.

In the practice of this invention, several plies of the flexible knife-stab resistant composite are provided and are adjacent to several plies of the ballistic-resistant composite, but are preferably not bonded thereto. Preferably the knife-stab resistant composite layers face outwards of the wearer so that the knife-stab resistant composite layers are the strike face, although surprisingly it has been found that the knife-stab resistant composite layers may alternatively face inwards of the wearer and knife-stab resistance can still be maintained. In the latter configuration, the knife-stab resistant package can also act as a trauma-reduction pad.

In one embodiment, a vest is formed in a conventional manner from a plurality of ballistic-resistant composite layers. These layers preferably are not laminated together but may be stitched together to avoid slippage of the individual plies with respect to each other. Alternatively, they could be laminated to one another. To provide the desired knife-stab resistance, a liner formed from a plurality of knife-stab resistant composite layers is worn with the ballistic-resistant composite layers; preferably, the liner faces outwardly of the ballistic-resistant layers, although this could be reversed as mentioned above.

The laminates useful in the ballistic resistant layers of this invention preferably are flexible and may be impregnated with or embedded in a matrix composition of an elastomer, as is known in the art.

The elastomer useful in the ballistic resistant layers preferably possesses initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomer has initial tensile modulus equal to or less than about 1,200 psi (8.23 MPa).

A wide variety of elastomeric materials may be used. For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, copolymers of ethylene.

Preferred for polyethylene fabrics are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type R-$(BA)_x$(x=3-150); wherein A is a block from a polyvinyl aromatic monomer and B is a block from a conjugated diene elastomer. Many of these polymers are produced commercially by Kraton Polymers, Inc.

The elastomer ma)y be compounded with fillers such as carbon black, silica, etc and may be extended with oils and vulcanized by sulfur, peroxide, metal oxide or radiation cure systems using methods well known to rubber technologists. Blends of different elastomeric materials may be used together or one or more elastomers may be blended with one or more thermoplastics.

The elastomer preferably forms about 1 to about 30 percent by weight of the ballistically resistant laminate. More preferably, the elastomer forms about 2 to about 20 percent by weight of such laminate.

The elastomer coating may be applied by spraying or roll coating a solution of the elastomer onto the surface of the woven fabric followed by drying. Alternatively, the elastomer may be formed into a film or sheet and applied to the surface of the woven fabric by means of pressure and/or heat. It is preferred that block copolymer elastomers of the styrene-isoprene-styrene or the styrene-butadiene-styrene type are applied by roll coating of a solution followed by drying.

The following non-limiting examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1

A knife-stab resistant composite was formed from a woven fabric (style 902) of 1200 denier polyethylene yarn, designated SPECTRA® 900 from Honeywell International Inc., having tensile properties of 30 g/d tenacity, 850 g/d modulus and 63 J/g energy-to-break. The fabric was a 17×17 ends/inch (6.7×6.7 ends/cm) plain weave fabric having a thickness of 0.018 inch (0.46 mm).

A bonding layer film formed from an ethylene vinyl acetate polymer (EVA) film having a thickness of 0.003 inch (0.076 mm) was attached to both sides of the fabric. The rubber compound layer was formed from a blend of 80% natural rubber and 20% of styrene butadiene (formulation 2148 from Specialty Tires). The rubber layer and bonding layer were attached to both sides of the fabric.

The composite was formed into a roll and cured in an oven while rotating for 8 hours at 160° F. Samples measuring 12×12 inches (30.5×30.5 cm) were formed from the roll and were then post cured in a press at 260° F. for 1 hour.

After curing, a one ply construction of 0.095 inch rubber/0.003 inch EVA/0.018 inch fabric/0.003 inch EVA/0.025 inch rubber was formed. This one ply construction was used as the knife-stab resistant layer of a composite. For ease of reference, the knife-stab resistant layers of these examples are referred to as a "stab package". The stab package had a weight of 0.813 pounds per square foot (3.97 kg/m$^2$) and a thickness of from 0.144 to 0.146 inches (3.56 to 3.71 mm).

A ballistic package was also employed in Example 1. This package was formed from SPECTRA SHIELD® LCR flexible non-woven ballistic fabric available from Honeywell International Inc. SPECTRA SHIELD® LCR is a roll of 2 plies of unidirectional high strength, high modulus SPECTRA® polyethylene fibers polyethylene fibers with a thermoplastic elastomer resin matrix, cross-plied 0°/90° and sandwiched with a thermoplastic film, and is useful in soft armor. The SPECTRA® polyethylene fibers have a tenacity of 30 g/d, a tensile modulus of 850 g/d and an energy-to-break of 45 g/d. A total of 39 plies of the SPECTRA SHIELD® LCR fabric were used, with a total weight of 1.236 pounds per square foot (6.03 kg/m$^2$). The ballistic package had a National Institute of Justice (NIJ) rating of Level IIIA. The size of the ballistic package sample was also 12×12 inches (30.5×305. cm).

The stab package and the ballistic package were arranged in a canvas bag such that the stab package was facing outwardly and was thus the strike face.

The stab resistance was tested in accordance with the NIJ Stab Resistance of Personal Body Armor NIJ Standard 0115.00. Different types of knives and protection levels are used in the test. The engineered knife blades designated S1 knife and P1 knife were used. The S1 knife has a blade of about ⅛ inch (3.18 mm) thick with two cutting edges. The P1 knife has a blade of about 1/16 inch (1.59 mm) thick with one cutting edge; this knife is harder to stop penetration than the S1 knife.

For each threat (type of knife), there are three protection levels (L1, L2 and L3), and there are two impact (or strike) energies in each level.

Each weapon is tested at different angles of incidence, with the 0 degree angle of incidence being the most rigorous. The stab protection requirements for the Examples of this invention are set forth in Table I, below:

TABLE 1
IMPACT PROTECTION LEVELS

| Level | Energy E1 (J) | Energy E2 (J) |
|---|---|---|
| L1 | 24 ± 0.5 | 36 ± 0.6 |
| L2 | 33 ± 0.6 | 50 ± 0.7 |
| L3 | 43 ± 0.6 | 65 ± 0.8 |

Pass/Fail Criteria:
At energy E1: penetration cannot exceed 7 mm
At energy E2: penetration cannot exceed 20 mm When tested at 0 and 45 degrees angle of incidence, the combined stab package and ballistic package of this Example 1 passed the knife-stab protection standard with both S1 and P1 knifes and at energy levels E1 and E2 for each knife. The results are shown in Table 2, below.

Example 2

Example 1 was repeated using two plies of the construction of Example 1 in the stab package. The ballistic package was formed from SPECTRA SHIELD® LCR non-woven ballistic fabric. A total of 32 plies was used, which had a weight of 0.990 pounds per square foot (4.833 kg/m$^2$) and had a NIJ rating of Level II.

The results of the stab protection tests are also shown in Table 2. As can be seen, the combined stab package and ballistic package passed the test with the more difficult to stop knife P1, at the more difficult angle of incidence of 0 degrees and at both energy levels E1 and E2.

Example 3

Example 2 was repeated, except that the ballistic package of Example 1 was used. The results of the stab protection tests are also shown in Table 2. As can be seen, the combined stab package and ballistic package passed the test with the more difficult to stop knife P1, at the more difficult angle of incidence of 0 degrees and at both energy levels E1 and E2.

Example 4

In this example, two different composites were used in the stab package. One ply was the same as in Example 1. The second ply was formed of a composite of 0.025 inch (0.635 mm) rubber/0.003 inch (0.076 mm) EVA/0.018 inch (0.457 mm) fabric/0.003 inch (0.076 mm) EVA/0.025 inch (0.635 mm) rubber. The same fabric and rubber as used in Example 1 was employed. The stab package had a weight of 1.229 pounds per square foot (6.0 kg/n$^2$) and a thickness of 0.215-0.227 inch (5.461-5.766 mm). The ballistic package was GOLD FLEX® flexible composite from Honeywell International Inc., which is a roll product of 4 plies of unidirectional aramid fiber tapes with a thermoplastic resin matrix, cross-plied 0°/90°, 0°/90° and sandwiched with a thermoplastic film. This is an aramid shield product useful for soft armor. A total of 24 plies were used in the ballistic package, which had a weight of 1.178 pounds per square foot (5.751 kg/m$^2$). The ballistic package had a NIJ Level IIIA rating.

The results of the stab protection tests are also shown in Table 2. As can be seen, the combined stab package and ballistic package passed the test with the both knives S1 and P1, at angles of incidence of 0 and 45 degrees, and at both energy levels.

Example 5

Example 2 was repeated, except that the ballistic package was GOLD FLEX® flexible composite. The ballistic package was formed from 18 plies, had a weight of 0.864 pounds per square foot and had a NIJ Level II rating.

The results of the knife-stab resistance tests are also shown in Table 2. As can be seen, the combined stab package and ballistic package passed the test with the more difficult to stop knife P1, at the more difficult angle of incidence of 0 degrees and at both energy levels E1 and E2.

Example 6

In this example, the knife-stab resistant layer was formed from a composite of 0.025 inch (0.635 mm) rubber/0.003 inch (0.076 mm) EVA/0.018 inch (0.457 mm) fabric/0.003 (0.076 mm) inch EVA/0.025 inch (0.635 mm) rubber. The fabric and rubber were the same as used in the second ply of Example 4. The stab package had a weight of 0.388 pounds per square foot (1.894 kg/m²) and a thickness of 0.071-079 inch (1.803-2.007 mm). The ballistic package was a Kevlar® 29 fabric from Du Pont, which according to the manufacturer is formed from (poly(phenylene terephthalamide)) yarns having a tenacity of 23 g/d and a tensile modulus of 550 g/d. This fabric did not have a resin coating but rather was a dry fabric. A total of 32 plies of the Kevlar fabric were used in the ballistic package, which had a weight of 1.508 pounds per square foot (7.362 kg/M²). The ballistic package had a NIJ Level IIIA rating.

The results of the knife-stab resistance tests are also shown in Table 2. As can be seen, the combined stab package and ballistic package passed the test with both knives S1 and P1, at the more difficult angle of incidence of 0 degrees and at both energy levels E1 and E2.

Example 7

In this example, the knife-stab resistant package was similar to that used in Example 1, except for the weight of the rubber. The weight of the knife-stab resistant layers was 0.835 pounds per square foot (4.076 kg/m²), with a thickness of 0.145-0.146 inches (3.683-3.708 mm). The ballistic package was the same as used in Example 6.

The results of the knife-stab resistance tests are also shown in Table 2. As can be seen, the combined stab package and ballistic package passed the test with the both knives S1 and P1, at both angles of incidence of 0 and 45 degrees and at both energy levels E1 and E2.

TABLE II
KNIFE-STAB RESISTANCE PERFORMANCE

| Ex. No. | Level | Angle of Incidence | Threat Weapon | Energy Level | Allowed Penetration | Actual Penetration |
|---|---|---|---|---|---|---|
| 1 | L1 | 0 | S1 knife | E1 | 7 | 0 |
|   | L1 | 0 | S1 knife | E2 | 20 | 0 |
|   | L1 | 0 | P1 knife | E1 | 7 | 2 |
|   | L1 | 0 | P1 knife | E2 | 20 | 16 |
|   | L1 | 45 | S1 knife | E1 | 7 | 0 |
|   | L1 | 45 | P1 knife | E1 | 7 | 0 |
| 2 | L2 | 0 | P1 knife | E1 | 7 | 6 |
|   | L2 | 0 | P1 knife | E2 | 20 | 20 |
| 3 | L2 | 0 | P1 knife | E1 | 7 | 1 |
|   | L2 | 0 | P1 knife | E2 | 20 | 17 |
| 4 | L1 | 0 | S1 knife | E1 | 7 | 0 |
|   | L1 | 0 | S1 knife | E2 | 20 | 0 |
|   | L1 | 0 | P1 knife | E1 | 7 | 6 |
|   | L1 | 0 | P1 knife | E2 | 20 | 17 |
|   | L1 | 45 | S1 knife | E1 | 7 | 0 |
|   | L1 | 45 | P1 knife | E1 | 7 | 0 |
| 5 | L2 | 0 | P1 knife | E1 | 7 | 6 |
|   | L2 | 0 | P1 knife | E2 | 20 | 6 |
| 6 | L1 | 0 | S1 knife | E1 | 7 | 0 |
|   | L1 | 0 | S1 knife | E2 | 20 | 0 |
|   | L1 | 0 | P1 knife | E1 | 7 | 2 |
|   | L1 | 0 | P1 knife | E2 | 20 | 9 |
| 7 | L2 | 0 | S1 knife | E1 | 7 | 0 |
|   | L2 | 0 | S1 knife | E2 | 20 | 0 |
|   | L2 | 0 | P1 knife | E1 | 7 | 1 |
|   | L2 | 0 | P1 knife | E2 | 20 | 16 |
|   | L2 | 45 | S1 knife | E1 | 7 | 0 |
|   | L2 | 45 | P1 knife | E1 | 7 | 1 |

It can be seen that the samples of each of Examples 1-7 pass the NIJ test with both the S1 and P1 knives and at both the E1 and E2 impact energy levels. These samples pass the L1 and/or L2 level requirements of the test.

Accordingly, it can be seen that the present invention provides body armor which is both flexible and knife-stab resistant. Such body armor is less bulky and comfortable to wear. The body armor can also include ballistic resistant layers, which may also be flexible, so as to provide a knife-stab and ballistic resistant body armor.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. Flexible body armor which is knife-stab resistant, said body armor comprising at least one layer of a flexible composite, said flexible composite comprising a fabric base formed from a network of high tenacity fibers, and a rubber layer bonded to said fabric base, wherein said rubber layer comprises a rubber compound selected from the group consisting of a blend of natural rubber and styrene butadiene; a blend of natural rubber and polybutadiene; and a blend of natural rubber, styrene butadiene, and polybutadiene.

2. The flexible body armor of claim 1 further comprising a bonding layer comprising a thermoplastic material bonded to said fabric base and said rubber layer.

3. The flexible body armor of claim 2 wherein said high tenacity fibers have a tenacity of at least about 30 grams per denier.

4. The flexible body armor of claim 2 wherein at least about 50 percent by weight of the fibers in said fabric comprise said high tenacity fibers.

5. The flexible body armor of claim 2 wherein said high tenacity fibers are selected from the group consisting of high molecular weight polyethylene, high molecular weight polypropylene, aramid, polyvinyl alcohol, polyacrylonitrile, polybenzazole, polyester and rigid rod fibers and blends thereof.

6. The flexible body armor of claim 2 wherein said high tenacity fibers are selected from the group consisting of high molecular weight polyethylene, aramid and blends thereof.

7. The flexible body armor of claim 2 wherein said high tenacity fibers comprise high molecular weight polyethylene.

8. The flexible body armor of claim 2 wherein said fabric is a woven fabric.

9. The flexible body armor of claim 2 wherein said thermoplastic material is selected from the group consisting of polyethylene, ethylene vinyl acetate and blends thereof.

10. The flexible body armor of claim 2 further comprising at least one ballistic resistant composite comprising a network of high tenacity fibers, whereby said body armor is also resistant to ballistic impact.

11. The flexible body armor of claim 10 wherein said high tenacity fibers of said ballistic resistant composite are selected from the group consisting of high molecular weight polyethylene, high molecular weight polypropylene, aramid, polyvinyl alcohol, polyacrylonitrile, polybenzazole, polyester, rigid rod fibers, and blends thereof.

12. The flexible body armor of claim 11 wherein said high tenacity fibers of said ballistic resistant composite are selected from the group consisting of high molecular weight polyethylene, aramid and blends thereof.

13. The flexible body armor of claim 2 wherein said thermoplastic material is in the form of a film.

14. The flexible body armor of claim 13 wherein said thermoplastic material comprises ethylene vinyl acetate.

15. The flexible body armor of claim 14, wherein said film has a thickness of from about 4 to about 15 mils.

16. The flexible body armor of claim 2, wherein said flexible composite consists essentially of said fabric base, said rubber layer, and said bonding layer.

17. The flexible body armor of claim 2 comprising two bonding layers, each of which is located on one side of said fabric base, and two rubber layers, each of which is bonded to one of said bonding layers, with the result that said flexible body armor comprises a first rubber layer bonded to a first bonding layer which is bonded to one side of said fabric base, and a second rubber layer bonded to a second bonding layer which is bonded to an opposite side of said fabric base.

18. The flexible body armor of claim 1 wherein said armor comprises a plurality of said flexible composite.

19. The flexible body armor of claim 1, wherein said rubber compound comprises a blend of natural rubber, styrene butadiene, and polybutadiene.

20. The flexible body armor of claim 1 wherein said rubber layer has a thickness of from about 5 to about 50 mils.

21. The flexible body armor of claim 1, wherein said rubber layer comprises a rubber compound selected from the group consisting of a blend of 80% natural rubber and 20% styrene butadiene; a blend of 75% natural rubber and 25% polybutadiene; and a blend of from 25% to 66% natural rubber, 14% to 35% styrene butadiene, and 20% to 40% polybutadiene.

22. The flexible body armor of claim 1, wherein said fabric base weighs between about 2 and 15 ounces per square yard (about 67.8 to about 508.6 $g/m^2$), comprises between about 15 ends and 45 ends per inch (about 5.9 to about 17.7 ends per cm) in both the warp and fill directions, and wherein each of the warp and fill ends are between about 650 and 1200 denier.

23. Flexible body armor which is knife-stab resistant, said body armor comprising at least one layer of a flexible composite, said flexible composite comprising a fabric base formed from a network of high tenacity fibers, a rubber layer bonded to said fabric base, and a bonding layer comprising a thermoplastic material bonded to said fabric base and said rubber layer, wherein said rubber layer comprises a rubber compound selected from the group consisting of a blend of natural rubber and styrene butadiene; a blend of natural rubber and polybutadiene; and a blend of natural rubber, styrene butadiene, and polybutadiene.

24. Flexible body armor which is knife-stab resistant, said body armor comprising at least one layer or of a flexible composite said flexible composite comprising a fabric base formed from a network of high tenacity fibers, a rubber layer bonded to said fabric base, and a bonding layer comprising a thermoplastic material bonded to said fabric base and said rubber layer, wherein said rubber layer comprises a blend of natural rubber and styrene butadiene.

25. Flexible body armor which is knife-stab resistant and is also ballistic resistant, said body armor comprising at least one knife-stab resistant layer of a flexible composite, said flexible composite comprising a fabric base formed from a network of high tenacity fibers and a rubber layer bonded to said fabric base, and at least one layer of a flexible ballistic-resistant composite comprising a network of high tenacity fibers, wherein said rubber layer comprises a rubber compound selected from the group consisting of a blend of natural rubber and styrene butadiene; a blend of natural rubber and polybutadiene; and a blend of natural rubber, styrene butadiene, and polybutadiene.

26. The flexible body armor of claim 25 wherein said knife-stab resistant layer further comprises a bonding layer comprising a thermoplastic material bonded to said fabric base and said rubber layer.

27. The flexible body armor of claim 26 wherein said body armor comprises a plurality of said knife-stab resistant layers and a plurality of said ballistic resistant layers.

28. The flexible body armor of claim 27 wherein said high tenacity fibers of both said knife-stab resistant layers and said ballistic-resistant layers independently are selected from the group consisting of high molecular weight polyethylene, high molecular weight polypropylene, aramid, polyvinyl alcohol, polyacrylonitrile, polybenzazole, polyester, rigid rod fibers, and blends thereof.

29. Flexible body armor which is knife-stab resistant and is also ballistic resistant, said body armor comprising a plurality of knife-stab resistant layers of a flexible composite, said flexible composite comprising a fabric base formed from a network of high tenacity fibers and a rubber layer bonded to said fabric base, and a plurality of flexible ballistic-resistant composite layers comprising a network of high tenacity fibers, wherein said knife-stab resistant layer further comprises a bonding layer comprising a thermoplastic material bonded to said fabric base and said rubber layer, and wherein said high tenacity fibers of both said knife-stab resistant layers and said ballistic-resistant layers independently are selected from the group consisting of high molecular weight polyethylene, aramid and blends thereof, wherein said rubber layer comprises a rubber compound selected from the group consisting of a blend of natural rubber and styrene butadiene; a blend of natural rubber and polybutadiene; and a blend of natural rubber, styrene butadiene, and polybutadiene.

30. The flexible body armor of claim 29 wherein said thermoplastic material is selected from the group consisting of polyethylene, ethylene vinyl acetate and blends thereof.

31. Flexible body armor which is knife-stab resistant and is also ballistic resistant, said body armor comprising a plurality of knife-stab resistant layers of a flexible composite, said flexible composite comprising a fabric base formed from a network of high tenacity fibers and a rubber layer bonded to said fabric base, and a plurality of flexible ballistic-resistant composite layers comprising a network of high tenacity fibers, wherein said knife-stab resistant layer further comprises a bonding layer comprising a thermoplastic material bonded to said fabric base and said rubber layer, and wherein said high tenacity fibers of both said knife-stab resistant layers and said ballistic-resistant layers independently are selected from the group consisting of high molecular weight polyethylene, aramid and blends thereof, wherein said rubber compound comprises natural rubber and styrene butadiene.

32. The flexible body armor of claim 31 wherein said fabric base of said knife-stab resistant layers comprise a woven fabric wherein at least about 50 percent by weight of the fibers in said fabric comprise high molecular weight polyethylene fibers.

33. Flexible body armor which is knife-stab resistant and is also ballistic resistant, said body armor comprising a plurality of knife-stab resistant layers of a flexible composite, said flexible composite comprising a fabric base formed from a network of high tenacity fibers, at least 50 percent by weight of the fibers in the fabric comprising high molecular weight polyethylene, a bonding layer comprising a thermoplastic material bonded to said fabric base, and a rubber layer bonded to said bonding layer; and a plurality of flexible ballistic-resistant composite layers, said flexible ballistic-resistant composite layers comprising a network of high tenacity fibers comprising at least 50 percent by weight of fibers selected from the group consisting of high molecular weight polyethylene, aramid, and blends thereof; and wherein said rubber layer comprises a rubber compound selected from the group consisting of a blend of natural rubber and styrene butadiene; a blend of natural rubber and polybutadiene; and a blend of natural rubber, styrene butadiene, and polybutadiene.

34. The flexible body armor of claim 33 wherein said fabric base of said flexible composite of said knife-stab resistant layers comprises a woven fabric, and said flexible ballistic composite layers are in the form of non-woven fabrics.

35. Flexible body armor which is knife-stab resistant and is also ballistic resistant, said body armor comprising a plurality of knife-stab resistant layers of a flexible composite, said flexible composite comprising a fabric base formed from a network of high tenacity fibers, at least 50 percent by weight of the fibers in the fabric comprising said high tenacity fibers, a bonding layer comprising a thermoplastic material bonded to said fabric base, and a rubber layer bonded to said bonding layer; and a plurality of flexible ballistic-resistant composite layers, said flexible ballistic-resistant composite layers comprising a network of high tenacity fibers comprising at least 50 percent by weight of said high tenacity fibers; wherein said fabric base of said flexible composite of said knife-stab resistant layers comprises a woven fabric, said flexible ballistic composite layers are in the form of non-woven fabrics, said rubber layer comprises a rubber compound comprising natural rubber and styrene butadiene, and said high tenacity fibers of said flexible composite of said knife-stab resistant layers comprise high molecular weight polyethylene fibers and said high tenacity fibers of said ballistic-resistant composite layers comprise high molecular weight polyethylene fibers.

36. The flexible body armor of claim 35 wherein said thermoplastic material of said bonding layer comprises ethylene vinyl acetate.

37. The flexible body armor of claim 36 wherein said fabric base of said flexible composite of said knife-stab resistant layers weighs between about 2 and 15 ounces per square yard (about 67.8 to about 508.6 g/m$^2$), comprises between about 15 ends and 45 ends per inch (about 5.9 to about 17.7 ends per cm) in both the warp and fill directions, and wherein each of the warp and fill ends are between about 650 and 1200 denier.

38. Flexible body armor which is knife-stab resistant, said body armor comprising at least one layer of a flexible composite, said flexible composite comprising a fabric base formed from a network of high tenacity fibers, and a rubber layer bonded to said fabric base through a bonding layer, said bonding layer comprising a thermoplastic material, said rubber layer comprising a rubber compound comprising natural rubber and styrene butadiene.

39. Flexible body armor which is knife-stab resistant, said body armor comprising at least one layer of a flexible composite, said flexible composite comprising a fabric base formed from a network of high tenacity fibers, and a rubber layer bonded to said fabric base, wherein said rubber layer comprises a rubber compound comprising natural rubber and styrene butadiene.

40. Flexible body armor which is knife-stab resistant and is also ballistic resistant, said body armor comprising a plurality of knife-stab resistant layers of a flexible composite, said flexible composite comprising a fabric base formed from a network of high tenacity fibers and a rubber layer bonded to said fabric base via a bonding layer, said bonding layer comprising a thermoplastic material bonded to said fabric base and said rubber layer, and a plurality of flexible ballistic-resistant composite layers comprising a network of high tenacity fibers, said high tenacity fibers of both of said knife-stab resistant layers and said ballistic-resistant layers being independently selected from the group consisting of high molecular weight polyethylene, aramid and blends thereof, said rubber layer comprising a rubber compound comprising natural rubber and styrene butadiene.

41. Flexible body armor which is knife-stab resistant and is also ballistic resistant, said body armor comprising at least one knife-stab resistant layer of a flexible composite, said flexible composite comprising a fabric base formed from a network of high tenacity fibers and a rubber layer bonded to said fabric base, and at least one layer of a flexible ballistic-resistant composite comprising a network of high tenacity fibers, wherein said rubber layer comprises a rubber compound comprising a blend of natural rubber, styrene butadiene, and polybutadiene.

42. Flexible body armor which is knife-stab resistant and is also ballistic resistant, said body armor comprising at least one knife-stab resistant layer of a flexible composite, said flexible composite comprising a fabric base formed from a network of high tenacity fibers and a rubber layer bonded to said fabric base, and at least one layer of a flexible ballistic-resistant composite comprising a network of high tenacity fibers, wherein said rubber layer comprises a rubber compound comprising natural rubber and styrene butadiene.

43. Flexible body armor which is knife-stab resistant and is also ballistic resistant, said body armor comprising a plurality of knife-stab resistant layers of a flexible composite, said flexible composite comprising a fabric base formed from a network of high tenacity fibers, at least 50 percent by weight of the fibers in the fabric comprising high molecular weight polyethylene, a bonding layer comprising a thermoplastic material bonded to said fabric base, and a rubber layer bonded to said bonding layer; and a plurality of flexible ballistic-resistant composite layers, said flexible ballistic-resistant composite layers comprising a network of high tenacity fibers comprising at least 50 percent by weight of high molecular weight polyethylene fibers, said rubber layer comprising a rubber compound comprising natural rubber and styrene butadiene, said fabric base of said flexible composite of said knife-stab resistant layers comprising a woven fabric, said flexible ballistic-resistant composite layers being in the form of non-woven fabrics, said high tenacity fibers of said flexible composite of said knife-stab resistant layers comprising high molecular weight polyethylene fibers and said high tenacity fibers of said ballistic-resistant composite layers comprising high molecular weight polyethylene fibers.

44. Flexible body armor which is knife-stab resistant and is also ballistic resistant, said body armor comprising a plurality of knife-stab resistant layers of a flexible composite, said flexible composite comprising a fabric base formed from a network of high tenacity fibers, at least 50 percent by weight of the fibers in the fabric comprising high molecular weight polyethylene, a bonding layer comprising a thermoplastic material bonded to said fabric base, and a rubber layer bonded to said bonding layer; and a plurality of flexible ballistic-resistant composite layers, said flexible ballistic-resistant composite layers comprising a network of high tenacity fibers comprising at least 50 percent by weight of fibers selected from the group consisting of high molecular weight polyethylene, aramid, and blends thereof, and wherein said rubber layer comprises a rubber compound comprising a blend of natural rubber, styrene butadiene, and polybutadiene.

45. Flexible body armor which is knife-stab resistant and is also ballistic resistant, said body armor consisting essentially of a plurality of knife-stab resistant layers of a flexible composite, said flexible composite consisting essentially of a fabric base formed from a network of high tenacity fibers comprising at least about 50 percent by weight of said high tenacity fibers, a bonding layer comprising a thermoplastic material bonded to said fabric base, and a rubber layer bonded to said bonding layer, said rubber layer comprising a rubber compound selected from the group consisting of a blend of natural rubber and styrene butadiene, a blend of natural rubber and polybutadiene, and a blend of natural rubber, styrene butadiene, and polybutadiene; and a plurality of flexible ballistic-resistant composite layers, said flexible ballistic-resistant composite layers consisting essentially of a network of high tenacity fibers comprising at least 50 percent by weight of high tenacity fibers.

46. The flexible composite of claim 45 wherein said fabric base of said flexible composite of said knife-stab resistant layers comprises a woven fabric, and said flexible ballistic composite layers are in the form of non-woven fabrics.

47. A method of improving the knife-stab resistance of flexible body armor, said method comprising forming said body armor from a flexible composite by bonding a rubber layer to a fabric base; said fabric base being formed from a network of high tenacity fibers; and said rubber layer comprising a rubber compound selected from the group consisting of a blend of natural rubber and styrene butadiene, a blend of natural rubber and polybutadiene, and a blend of natural rubber, styrene butadiene, and polybutadiene.

48. The method of claim 47 wherein said fabric is a woven fabric, wherein said high tenacity fibers are selected from the group consisting of high molecular weight polyethylene, aramid and blends thereof, and wherein said bonding step comprises bonding said rubber layer to said fabric base using a thermoplastic bonding layer.

* * * * *